United States Patent [19]

Notoya

[11] 4,358,081
[45] Nov. 9, 1982

[54] BUNDLING FASTENER FOR BARS AND WIRES

[75] Inventor: Yoshiaki Notoya, Zushi, Japan

[73] Assignee: Nifco Inc., Yokohama, Japan

[21] Appl. No.: 213,804

[22] Filed: Dec. 8, 1980

[30] Foreign Application Priority Data

Dec. 14, 1979 [JP] Japan .......................... 54-172240[U]

[51] Int. Cl.³ .............................................. F16L 3/08
[52] U.S. Cl. .................................. 248/73; 24/16 PB; 24/204; 248/74 A; 248/74 PB
[58] Field of Search ...................... 248/73, 74 A, 74 B, 248/74 PB, 71, 221.4, 499; 24/16 PB, 204, 256, 257

[56] References Cited

U.S. PATENT DOCUMENTS

| | | | |
|---|---|---|---|
| 3,118,644 | 1/1964 | Wernig | 248/73 |
| 3,461,513 | 8/1969 | Girard et al. | 24/204 |
| 3,667,710 | 6/1972 | Moody et al. | 248/73 X |
| 3,955,246 | 5/1976 | Tanaka | 24/204 |
| 3,994,048 | 11/1976 | Rosenthal | 24/204 X |
| 4,143,577 | 3/1979 | Eberhardt | 248/71 X |

Primary Examiner—William H. Schultz
Assistant Examiner—Ramon O. Ramirez
Attorney, Agent, or Firm—Jerold M. Forsberg; Thomas W. Buckman; Jack R. Halvorsen

[57] ABSTRACT

A bundling fastener for bars or wires comprises a bundling member and a fastener member serving to attach the bundling member to a support. Owing to the use of a press-on and split-off type fastener as the bundling member, the bundling fastener provides perfect bundling of bars or wires even when the total bundle diameter or the number of bars or wires is varied.

5 Claims, 10 Drawing Figures

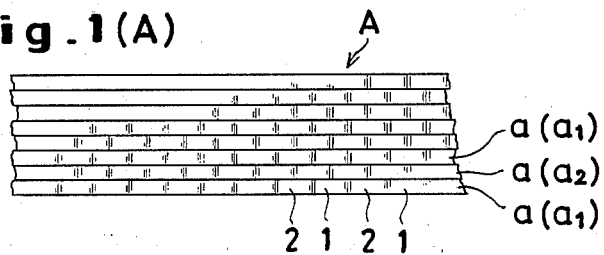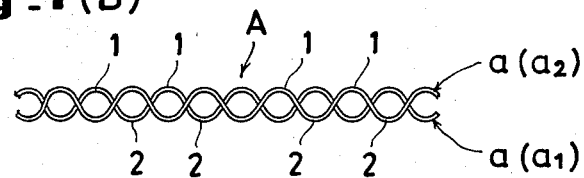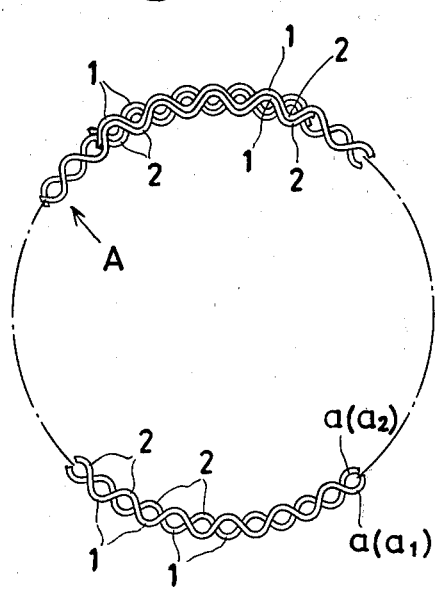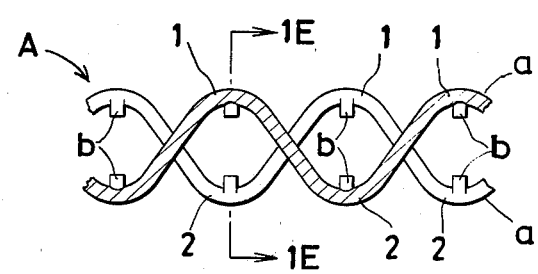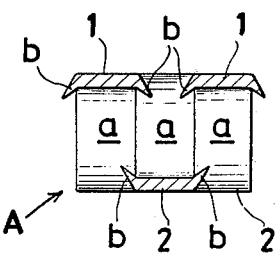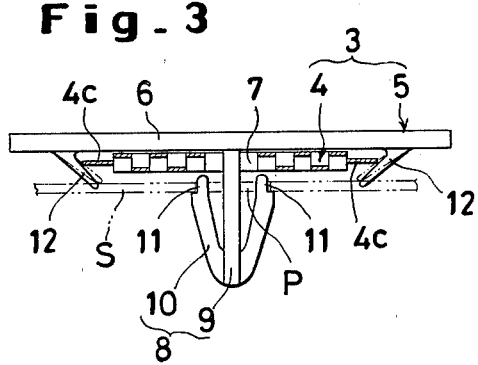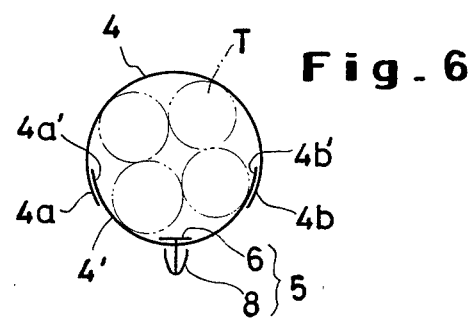

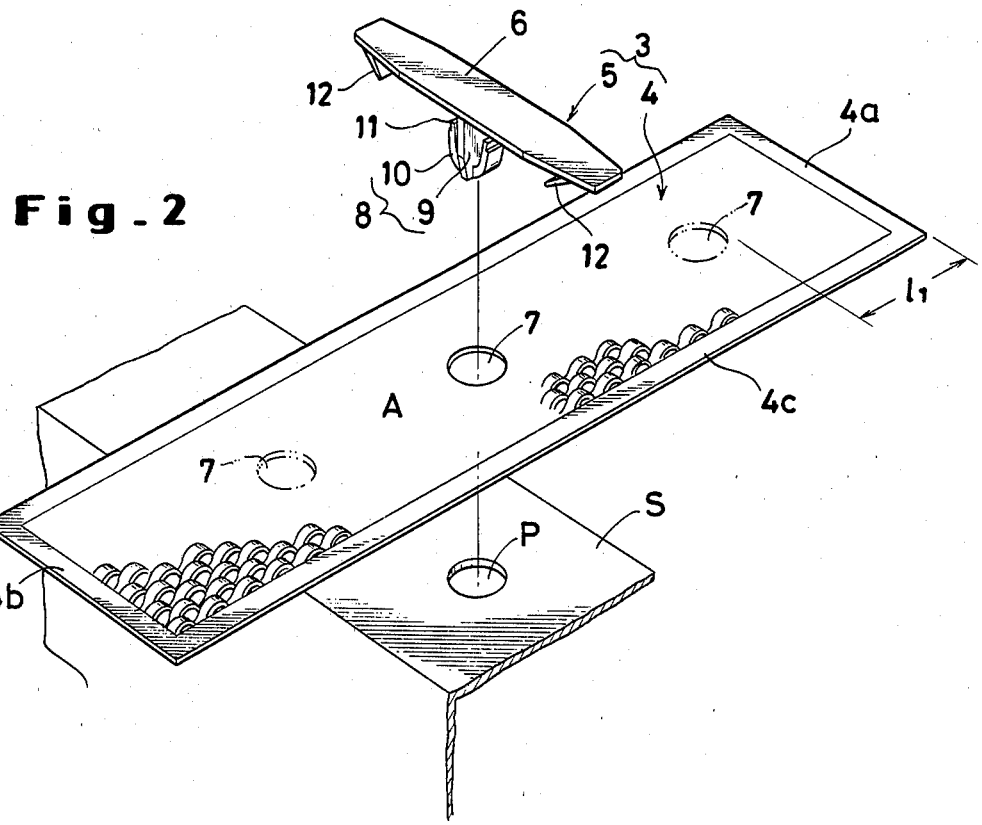
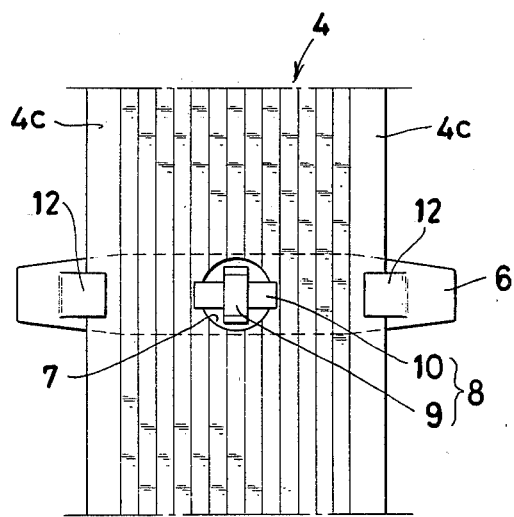
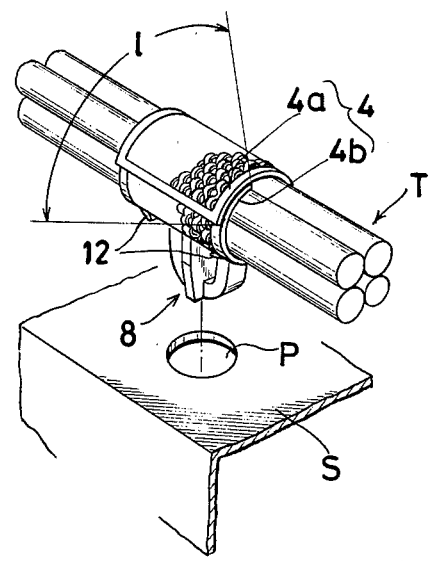

BUNDLING FASTENER FOR BARS AND WIRES

BACKGROUND OF THE INVENTION

This invention relates to a bundling fastener for bars and wires, which bundles bars and wires such as electric cables and pipes and fastens them as bundled to a support.

In places congested with electric wires such as electric appliances having internal wiring and vehicles having wires connecting various electric devices, it is a common practice for those electric wires laid in one general direction to be bundled at proper points selected in the common direction of their length and for the bundled points of the wires to be fastened to a support such as a chassis so as to keep the wires from swaying unsteadily.

A bundling fastener to be used for these and other similar applications, by nature, is composed of a bundling member serving to bundle a plurality of electric wires and a fastener member serving to fasten the wires as bundled to a support such as a chassis. Generally, the fastener member makes use of the construction of a well-known plastic fastener or rivet. To be specific, the fastener member comprises a head portion and a resilient engaging element extended downwardly from the head portion and adapted to snap into engagement with the edge of a fitting hole bored in advance in the support.

In the conventional bundling fastener of this type, the fastener member has a construction basically similar to the construction described above and poses no particular problem. The bundling member, however, has been proposed in various designs. All these designs have had inherent drawbacks.

In one typical conventional device, the head portion of the fastener member is molded in the shape of a circularly or rectangularly curved frame containing an opening at one point thereof, and the curved frame so formed is utilized as a bundling member which serves to receive given bars or wires through the opening in the frame and hold them fast in position therein (as disclosed in U.S. Pat. No. 3,905,570 and No. 4,023,758, for example).

In this bundling member, however, since the size of the frame or the vacant space enclosed in the frame for admitting bars or wires is fixed at the time of the molding, the total diameter of bars or wires to be received (the diameter of the bundle of electric wires or the number of electric wires in the bundle) is fixed from the beginning. The bundling member, therefore, is incapable of bundling bars or wires whose total bundle diameter exceeds the frame's vacant space. In the case of bars or wires whose total bundle diameter is smaller than the frame's vacant space, they find ample room for play. In either case, the bundling member falls short of fulfilling its function.

In other devices, bundling members are in the form of so-called bundling straps (as disclosed in Japanese Unexamined Patent Publications No. 1094/1978 and No. 135722/1979, for example). They assume the general shape of strips. Each of these strips is provided at one end thereof with a bundle and at the other end thereof with a multiplicity of engaging claws, engaging holes, etc. adapted to be slid in the buckle and brought into fast engagement with the buckle. After the strip has been looped round given bars or wires, the loose end containing the aforementioned engaging means is inserted into the buckle. The loose end drawn out of the exit side of the buckle is given a pull to tighten the loop round the bars or wires bundled therewith.

Although this bundling member is highly advantageous in the sense of giving a generous allowance for bundle diameter, the loose end of the strap which stick out of the buckle after the tightening of the bundle is often a nuisance. The bundling member, therefore, has the disadvantage of inferior space factor. To avoid this trouble, there is entailed the extra work of cutting off the useless loose end of the strap. Besides, the work of inserting the loose end of the strap into the buckle within a limited space and then pulling it out of the buckle with considerable amount of force proves to be very troublesome.

In still other devices, a given bundle of electric wires, for example, is simply set in position on the head portion of a fastener member and then is fastened in that position by being forcibly covered with a cylinder (as disclosed in U.S. Pat. No. 3,944,177 and No. 4,061,299, for example). These devices lack allowance for bundle diameter and entail complex work.

SUMMARY OF THE INVENTION

An object of this invention is to provide a bundling fastener for bars or wires, which gives a generous allowance for the bundling diameter of given bars or wises, enjoys ease of bundling work and avoids taking up much space.

The bundling fastener provided by this invention comprises a bundling member and a fastener member serving to fasten the bundling member as wrapped round given bars or wires to a support. One of the characteristics of the bundling fastener of this invention resides in the fact that the so-called press-on and split-off type fastener possessing an engaging surface is utilized as the bundling member.

Since one press-on and split-off type fastener is utilized as the bundling member as described above, the bundling of given bars or wires is accomplished by looping the fastener round the bars or wires and thereafter piling the loose ends of the fastener one on top of the other and pressing them against each other. When the total bundle diameter of bars or wires or the total number of bars or wires to be bundled is changed, the bundling member can be stably retained in position by merely changing the position at which the loose ends of the fastener are joined to each other.

The other objects, characters and features of the present invention will become apparent from the further disclosure of the invention to be made hereinafter with reference to the accompanying drawing.

BRIEF DESCRIPTION OF THE DRAWING

FIG. 1(A) is a plan view of a typical press-on and split-off type fastener to be used as a bundling member in the bundling fastener provided by the present invention.

FIG. 1(B) is a side view of the fastener of FIG. 1(A).

FIG. 1(C) is an explanatory diagram for illustrating the condition in which the fastener of FIG. 1(A) is put to use.

FIG. 1(D) is an enlarged, longitudinally cross-sectioned view of another embodiment of the press-on and split-off type fastener to be used in the bundling fastener of this invention.

FIG. 1(E) is a sectioned view taken along the line 1E—1E in FIG. 1(D).

FIG. 2 is an exploded perspective view of one embodiment of the bundling fastener provided by the present invention.

FIG. 3 is a partially sectioned front view of the bundling fastener of FIG. 2.

FIG. 4 is a bottom view of the bundling fastener of FIG. 2.

FIG. 5 is a perspective view illustrating the condition in which bars or wires are bundled with the bundling fastener of FIG. 2.

FIG. 6 is a schematic explanatory diagram illustrating another embodiment of the bundling fastener provided by the present invention.

DESCRIPTION OF PREFERRED EMBODIMENTS

The bundling fastener for bars or wires which is provided by the present invention comprises a bundling member 4 and a fastener member 5 serving to fasten the bundling member 4 to a support. It utilizes a press-on and split-off type strip fastener as the bundling member. This strip fastener is known to the art (U.S. Pat. No. 3,869,764, No. 3,955,246 and No. 4,123,826). The basic construction of this strip fastener is illustrated in FIGS. 1(A) through 1(C).

This strip fastener A is formed of a plurality of laterally adjoining corrugated strips a each containing alternate ridges 1 and recesses 2, with the adjoining strips staggered relative to one another by a fixed pitch so that the ridges of one strip are laterally aligned with the recesses of adjoining strips. In the plan view of FIG. 1(A), adjoining corrugated strips are denoted by $a_1$, $a_2$. In the side view of FIG. 1(B), the condition in which the adjoining corrugated strips are staggered to one another is illustrated.

This strip-shaped (sheet-shaped for a greater width) fastener A is generally manufactured by extrusion molding a suitable synthetic resin into a flat strip and then, while the extruded strip is soft, passing this flat strip between a pair of gear type rolling dies provided on the peripheral surfaces with teeth matched to the ridges and recesses mentioned above. The strip fastener thus produced is cut to a length suitable for the intended use. One typical procedure for the manufacture of the strip fastener is disclosed in U.S. Pat. No. 3,999,924, for example.

Owing to the construction described above, when a fastener A cut to a suitable length is looped and then the loose ends of the looped fastener are piled up one on top of the other and are pressed against each other, the ridges 1 in one loose end force their way into the recesses 2 in the other loose end and the recesses on the first loose end snap astride the ridges of the second loose end. The loose ends thus joined to each other are retained in the joined state owing to the frictional force exerted by the ridges and recesses upon one another. Of course, the loose ends can be separated from each other by a pull given with a force overcoming the frictional force. This press-on and split-off function is manifested between two strip fasteners.

This basic design of the strip fastener may be modified by substituting flat surfaces for the recesses or forming the recesses with steep depressions thereby allowing the ridges to be directly joined with one another. FIGS. 1(D) and (E) illustrate other modifications which are formed by attaching small, laterally protruding projections or barbs b one each to the apexes of the ridges 1 and/or the bottoms of the recesses 2. When the two loose ends of the strip fastener are joined to each other, therefore, the barbs b are entangled with one another to add to the force with which the loose ends are joined. In another fastener design known to the art, the laterally adjoining corrugated strips are staggered with only a slight pitch relative to each other and claws are formed on the sloped surfaces of the ridges. For the purpose of present invention, any of the strip fasteners described above can be effectively utilized. In actual application of the invention, those illustrated in FIGS. 1(D) and (E) are adopted. The embodiments illustrated in and after FIG. 2 represent the cases wherein fasteners of the basic constructions shown in FIGS. 1(A) through (C) are used. While the bundling fastener 3 in the present embodiment comprises a bundling member 4 adapted to bundle one or more bars or wires and a fastener member 5 adapted to fasten the bundling member to a support S as described previously, the bundling member 4 is made of a strip fastener A of the type described above which has been cut to a length suitable for the intended use.

In the bundling member illustrated in FIG. 2, the opposite edges 4a, 4b terminating the length thereof are heat sealed in a flattened state to prevent the cut ends of the component corrugated strips a from being torn off and turned into loose strands and the opposite longitudinal edges 4c are similarly heat sealed. In most cases, longitudinal edges of the strip fastener are heat sealed by the producer of the fastener at the time the fastener is molded with the aforementioned rolling dies. For the sake of simplicity, the component corrugated strips a are illustrated only partially in the form of a model in FIG. 2.

For the strip fastener to serve effectively as the bundling member in the present embodiment, it is required to undergo another alteration, which is the formation therein of a through hole. This perforation will be described more fully afterward.

The fastener member 5 has the same basic components as the plastic solid fasteners of the class known to the art: It comprises a head portion 6 and a resilient engaging member 8 extended downwardly from the lower side of this head portion 6. The resilient engaging member 8 also makes use of the basic design known in the art popularly as the anchor type. It comprises a shank portion 9 extended downwardly from the head portion and a pair of resilient engaging pieces 10 extended from the opposite surfaces at the leading end of the shank portion, bent upwardly in the direction of the head portion and provided on the outer surfaces of the free ends thereof with engaging steps 11. Alternatively, this resilient engaging member 8 may be formed in any of the known shapes such as, for example, those called as canoe type and the hook type.

In contrast, the head portion 6 involved in the present embodiment is in the shape of a flat plate extending across the width of the bundling member 4. It has a length slightly greater than the width of the bundling member 4. From the lower surface of the head portion, a pair of inwardly slanted resilient wing pieces 12 are downwardly extended as separated from each other by a distance substantially equal to the width of the bundling member 4. The aforementioned resilient engaging member 8 is disposed so as to be downwardly extended substantially from the center of the head portion. Accordingly, in the bundling member 4, a through hole 7 large enough for permitting passage of the resilient engaging member 8 is formed at least at one position in the entire length thereof in the central portion relative to the width.

In the case of the present embodiment, the construction described so far enables the fastener member 5 and the bundling member 4 to be temporarily combined with each other. To be specific, the fastening member 5 is opposed to the main surface or engaging surface of the bundling member 4 and then the resilient engaging member 8 is inserted through the through hole 7 until it emerges from the opposite surface of the bundling member. During this insertion, the longitudinal edges 4c of the bundling member are bent up and then slid inside the opposite resilient wing pieces 12. Consequently, the bundling member 4 becomes embraced by the two resilient wing pieces 12 and remains in that position. It no longer falls off when it is released from the hand. The resilient wing pieces 12 have another function to fulfill as described afterward. If the temporary retention of the bundling member were the sole function, the resilient wing pieces would not be specially needed. Instead, the through hole 7 formed in the bundling member 4 might be given a decreased diameter so that the resilient engaging member 8 would have to be forcibly passed through that hole.

After the bundling fastener 3 has been preparatorily assembled as described above, the resilient engaging member 8 thereof is forced into the fitting hole P bored in advance in the support S. Because of the action of snap engagement obtainable with the fasteners of this type, the resilient engaging pieces 10 force their way through the interior of the through hole in an inwardly contracted form and, after the passage, regain their original shape to remain there fast, with their engaging steps 11 caught on the edge of the through hole (as indicated by the imaginary line of FIG. 3). At this point, if the aforementioned resilient wing pieces 12 are present, they push the support against the engaging steps 11 and give rise to a resilient squeezing force exerted on the support and increase the force with which the bundling fastener is held fast on the support or enhance the bundling fastener's allowance for the plate thickness of the support. Further, the resilient wing pieces serve to increase the retaining force of the bundling member 4, because they are deformed inwardly as indicated by the imaginary line of FIG. 3 after their leading ends have collided with the support S. Moreover, the inward inclination of these resilient wing pieces serves as means of a sort for curbing otherwise possible rotation of the bundling fastener. While the leading ends of the resilient wing pieces are retained as held in tight contact with the support, an effort to rotate the bundling fastener requires a force to be exerted in the direction of outwardly prying those portions in tight contact. When the wing pieces are inclined inwardly as they are in the present embodiment, the force must be unusually great to pry them outwardly. This means that the wing pieces are capable of preventing the bundling fastener from such rotation despite exertion of fairly great external force. As will be understood from the foregoing description, the plurality of functions which the resilient wing pieces 12 are expected to fulfill in the present embodiment may be optionally discharged by other separate components. For example, the temporary retention of the bundling member may be accomplished by proper adjustment of the diameter of the through hole 7 and the prevention of the rotation of the bundling fastener may be attained by stabilizing the fastening force as by separately providing check projections or forming the fitting hole P in a square shape. Consequently, the resilient wing pieces may be utilized as a cushion member discharging the role of absorbing variation in the plate thickness. In this case, the wing pieces may be slanted outwardly.

For the purpose of bundling given bars or wires with the bundling fastener 3 which has been fastened to the support S as described above, a simple operation described below will suffice.

On the strip-shaped bundling member 4 which is fastened, still in its original extended form, to the support by means of the fastener member 5, one or a plurality of bar-shaped or wire-shaped objects T are mounted. Then, the loose ends of the strip-shaped bundling member 4 are pulled up and looped round the objects T until the inner wall surface of the bundling member virtually squeezes the articles, with one of the loose ends laid over the other loose end and pressed down firmly. Consequently, owing to the action of adhesion described previously with reference to FIGS. 1(A) through (C), the two loose ends come into mutual adhesion to complete a closed loop as illustrated in FIG. 5 and give rise to a bundle of the objects T. Incidentally, FIG. 5 depicts a condition in which the bundling fastener 3 has not yet been attached to the support S. As illustrated here, the procedure of the fastening work may be reversed, namely, the step of bundling the objects T may precede the step of fastening the bundling fastener to the support S.

As is aptly depicted by FIG. 5, the bundling fastener 3 of this invention effectively fulfills its function independently of any possible change in the total diameter of the objects T. When the total diameter varies, the overlapping length l of the loose ends of the strip-shaped bundling member 4 is proportionally varied. The bundling fastener of this invention, thus, provides generous allowance for the change in the total diameter of objects.

The range of this allowance for the diameter, i.e. the minimum and maximum diameters of objects which can be bundled effectively, is determined by the length of the strip-shaped bundling member 4 in the design stage. The minimum diameter may possibly be determined by the position of the fastener member 5 in the total length of the bundling member 4. In other words, as indicated by the imaginary line in FIG. 2, when the through hole 7 perforated for permitting the passage of the resilient engaging member 8 of the fastener member 5 is located near one terminal of the strap, the length of the strap from the through hole to the nearer terminal ($l_1$ in the illustrated embodiment) represents the maximum overlapping length of the other loose end of the strap. This is because the size l indicated in FIG. 5 is governed by the size $l_1$. Taking advantage of this rule, a plurality of through holes 7 may be formed in the bundling member 4 as properly spaced in the longitudinal direction, so that the particular through hole for the insertion of the fastener member can be singled out from among them, depending on the intended use of the bundling fastener. Such use of the plurality of through holes not merely serves to fix the range of the allowance for bundle diameter but also permits estimation of the overlapping position of the loose ends of the strap relative to the outer surface of the loop. The selection among the plurality of through holes, therefore, can be made so that the overlap will occur at a position convenient for the bundling work, such as on the upper side of the loop, for example.

The stability with which the bundled objects T are retained increases with the increasing width of the bundling member. The selection of this width is a problem to be solved in due consideration of the size allowed for the bundling fastener to suit the particular purpose for which the fastener is used.

Another characteristic of the present invention consists in its extremely high space factor, viz. the fact that since the bundling member 4 is a thin strip and the loose ends of this strip are piled up one on top of the other after the strip has been looped round the objects, the overall diameter of the looped strip is substantially equal to the total diameter of the objects and, what is more, the looped strip avoids producing those dangling ends observed with the bundling strap used in the conventional fasteners.

The illustrated embodiment represents a case wherein various practical effects are conferred upon the fastener member 5 by the incorporation of the resilient wing pieces 12. In cases where no use is found for such effects, the head portion 5 of the fastener member may be in the shape of a flat plate or disk of a relatively small size. It will be apparent from the description given so far that, also in this case, the temporary combination of the fastener member with the bundling member can be accomplished by virtue of the diameter of the through hole 7. Where circumstances permit, the bundling member and the fastener member may be solidly joined as by adhesion or fusion.

In the illustrated embodiment, the bundling member 4 is made from one strip and only one opening occurs between the loose ends of the strip before the strip is looped round the objects and the loose ends are piled up one on top of the other. Alternatively, as illustrated by the dotted line in the model diagram of FIG. 6, the bundling member may be composed of two strips 4, 4' and the required bundling work may be carried out by attaching one of the strips to the support by means of the fastener member 5 and joining to the opposite ends 4a, 4b of this strip the corresponding ends 4a', 4b' of the other strip to complete a closed loop of the bundling member. When this particular method of bundling is employed, the strips 4, 4' may be formed respectively of male and female press-on and split-off type strip fasteners. In a typical set of male and female fasteners, hooks are densely planted on the engaging surface of one of the fasteners (mostly made of woven fabric) and small loops are densely planted on the engaging surface of the other fastener. The fasteners are joined by the engagement between the hooks and the small loops. In this case, the allowance for bundle diameter may be further increased by preparing the unbound strip 4' as a set of strips of varying lengths.

As described above, the present invention provides a bundling fastener for bars or wires, which offers generous allowance for bundle diameter, ensures perfect ease of bundling work, avoids taking up much space, costs little and assures high reliability of the bundling work. Thus, the invention ejoys great economic practicality.

What is claimed is:

1. A bundling device, adapted to be secured to a preapertured support such as a panel or the like from one side thereof and to adjustable retain a plurality of elongated articles such as wires or bars comprising a bundling member of a predetermined length adapted to encircle and retain said articles in a bundle having at least one aperture therein and a fastener member adapted to be releasably attached to said bundling member and to securely fasten said bundling member to said preapertured support, said bundling member including a strip with oppositely undulating portions whereby when the opposite ends of said strip are superimposed and pressed together the undulating portions register and are secured together, said fastener including a head portion with a length dimension greater than the width dimension of said strip and a resilient engaging member adapted to extend through said at least one aperture and the aperture in said preapertured support to secure said bundling member relative to said support, said head portion having a plurality of resilient wings extending angularly therefrom adapted to engage the marginal edges of said strip and retain the fastener relative thereto, said resilient engaging member including a shank portion extending from the same side of said head portion as said resilient wings and a pair of resilient members integrally formed with said shank portion extending from the distal end of said shank towards said head portion adapted to engage the backside of said preapertured support, wherein said plurality of resilient wings are further adapted to bias the head portion away from said preapertured support to thereby maintain said pair of resilient members in engagement with the backside of the preapertured support, whereby said bundling device may be secured positively to supports of varying thicknesses.

2. The bundling device according to claim 1, wherein said at least one aperture in said strip is sized to receive said resilient engaging member with a snap fit.

3. The bundling device according to claim 1, wherein said strip has a non-undulating frame along the margins thereof.

4. The bundling device according to claim 3, wherein said plurality of wings comprises two and said two wings are spaced apart a distance substantially equal to the width of said strip and are generally angled inwardly towards each other to thereby engage said frame of said strip.

5. The bundling device according to claim 1, wherein said bundling member includes an extension strip of the same general configuration as said first mentioned strip to cooperate therewith and increase the bundling capability.

* * * * *